(12) United States Patent
Spaur et al.

(10) Patent No.: US 8,027,293 B2
(45) Date of Patent: Sep. 27, 2011

(54) COMMUNICATION CHANNEL SELECTION AND USE

(75) Inventors: Charles W. Spaur, Aurora, CO (US); Mark Aaron Berman, San Francisco, CA (US); Hiroshi Sakurai, Tokyo (JP); Patrick J. Kennedy, Boulder, CO (US)

(73) Assignee: Cellport Systems, Inc., Boulder, CO (US)

( * ) Notice: Subject to any disclaimer, the term of this patent is extended or adjusted under 35 U.S.C. 154(b) by 1061 days.

(21) Appl. No.: 11/778,541

(22) Filed: Jul. 16, 2007

(65) Prior Publication Data

US 2009/0022095 A1  Jan. 22, 2009

(51) Int. Cl.
*H04W 4/00* (2009.01)

(52) U.S. Cl. ........ 370/329; 370/341; 370/322; 370/326; 370/335; 370/336; 370/431; 370/437; 370/345

(58) Field of Classification Search .................. 370/329, 370/331, 338, 341, 345, 322, 437, 326, 335, 370/336, 431

See application file for complete search history.

(56) References Cited

U.S. PATENT DOCUMENTS

| | | |
|---|---|---|
| 4,697,281 A | 9/1987 | O'Sullivan |
| 4,718,080 A | 1/1988 | Serrano et al. |
| 4,792,986 A | 12/1988 | Garner et al. |
| 4,837,800 A | 6/1989 | Freeburg et al. |
| 4,887,265 A | 12/1989 | Felix |
| 4,890,315 A | 12/1989 | Bendixen et al. |
| 4,972,457 A | 11/1990 | O'Sullivan |
| 4,977,609 A | 12/1990 | McClure |
| 4,989,146 A | 1/1991 | Imajo |
| 4,989,230 A | 1/1991 | Gillig et al. |
| 5,020,090 A | 5/1991 | Morris |
| 5,029,233 A | 7/1991 | Metroka |
| 5,046,187 A | 9/1991 | Takahashi |
| 5,048,117 A | 9/1991 | Aisaka et al. |
| 5,054,115 A | 10/1991 | Sawa et al. |
| 5,081,667 A | 1/1992 | Drori et al. |
| 5,095,480 A | 3/1992 | Fenner |
| 5,095,503 A | 3/1992 | Kowalski |
| 5,109,402 A | 4/1992 | Anderson et al. |
| 5,119,397 A | 6/1992 | Dahlin et al. |
| 5,127,041 A | 6/1992 | O'Sullivan |
| 5,146,486 A | 9/1992 | Lebowitz |

(Continued)

FOREIGN PATENT DOCUMENTS

DE  2051747  7/1971

(Continued)

OTHER PUBLICATIONS

U.S. Appl. No. 08/957,652, filed Oct. 24, 1997, Bentley.

(Continued)

*Primary Examiner* — Kamran Afshar
*Assistant Examiner* — Khalid Shaheed
(74) *Attorney, Agent, or Firm* — Sheridan Ross P.C.

(57) ABSTRACT

Methods and systems for characterizing requests for individual items of information available from a target address as part of a request for content are provided. The characterization of requests for items of information is applied to select one of a plurality of communication channels for servicing the request. In addition, where different requests for items of information are assigned to different communication channels, those different communication channels can be used to obtain items of information from the target address simultaneously.

21 Claims, 6 Drawing Sheets

U.S. PATENT DOCUMENTS

| | | | |
|---|---|---|---|
| 5,148,473 | A | 9/1992 | Freeland et al. |
| 5,189,734 | A | 2/1993 | Bailey et al. |
| 5,203,012 | A | 4/1993 | Patsiokas et al. |
| 5,212,722 | A | 5/1993 | Murata |
| 5,214,774 | A | 5/1993 | Welsch et al. |
| 5,235,595 | A | 8/1993 | O'Dowd |
| 5,237,570 | A | 8/1993 | Smolinske et al. |
| 5,260,988 | A | 11/1993 | Schellinger et al. |
| 5,274,837 | A | 12/1993 | Childress et al. |
| 5,276,703 | A | 1/1994 | Budin et al. |
| 5,276,908 | A | 1/1994 | Koohgoli et al. |
| 5,287,541 | A | 2/1994 | Davis et al. |
| 5,293,635 | A | 3/1994 | Faulk, Jr. et al. |
| 5,297,142 | A | 3/1994 | Paggeot et al. |
| 5,301,359 | A | 4/1994 | Van den Heuvel et al. |
| 5,331,634 | A | 7/1994 | Fischer |
| 5,331,635 | A | 7/1994 | Ota |
| 5,333,177 | A | 7/1994 | Braitberg et al. |
| 5,347,272 | A | 9/1994 | Ota |
| 5,353,023 | A | 10/1994 | Mitsugi |
| 5,371,734 | A | 12/1994 | Fischer |
| 5,408,684 | A | 4/1995 | Yunoki et al. |
| 5,428,636 | A | 6/1995 | Meier |
| 5,442,553 | A | 8/1995 | Parrillo |
| 5,442,633 | A | 8/1995 | Perkins et al. |
| 5,445,347 | A | 8/1995 | Ng |
| 5,446,736 | A | 8/1995 | Gleeson et al. |
| 5,455,347 | A | 10/1995 | Maekawa et al. |
| 5,459,660 | A | 10/1995 | Berra |
| 5,475,864 | A | 12/1995 | Hamabe |
| 5,475,868 | A | 12/1995 | Duque-Anton et al. |
| 5,479,479 | A | 12/1995 | Braitberg et al. |
| 5,483,524 | A | 1/1996 | Lev et al. |
| 5,491,690 | A | 2/1996 | Alfonsi et al. |
| 5,506,888 | A | 4/1996 | Hayes et al. |
| 5,509,123 | A | 4/1996 | Dobbins et al. |
| 5,513,379 | A | 4/1996 | Benveniste et al. |
| 5,515,043 | A | 5/1996 | Berard et al. |
| 5,519,621 | A | 5/1996 | Wortham |
| 5,519,884 | A | 5/1996 | Duque-Anton et al. |
| 5,526,404 | A | 6/1996 | Wiedeman et al. |
| 5,530,701 | A | 6/1996 | Stillman et al. |
| 5,535,274 | A | 7/1996 | Braitberg et al. |
| 5,544,222 | A | 8/1996 | Robinson et al. |
| 5,551,066 | A | 8/1996 | Stillman et al. |
| 5,561,836 | A | 10/1996 | Sowles et al. |
| 5,566,173 | A | 10/1996 | Steinbrecher |
| 5,594,718 | A | 1/1997 | Weaver, Jr. et al. |
| 5,594,943 | A | 1/1997 | Balachandran |
| 5,630,061 | A | 5/1997 | Richter et al. |
| 5,636,371 | A | 6/1997 | Yu |
| 5,646,939 | A | 7/1997 | Lindeborg et al. |
| 5,649,308 | A | 7/1997 | Andrews |
| 5,675,490 | A | 10/1997 | Bachhuber |
| 5,710,908 | A | 1/1998 | Man |
| 5,732,074 | A * | 3/1998 | Spaur et al. ............. 370/313 |
| 5,752,193 | A | 5/1998 | Scholefield et al. |
| 5,822,427 | A | 10/1998 | Braitberg et al. |
| 5,826,188 | A | 10/1998 | Tayloe et al. |
| 5,838,251 | A | 11/1998 | Brinkmeyer et al. |
| 5,941,972 | A | 8/1999 | Hoese et al. |
| 6,122,514 | A | 9/2000 | Spaur et al. |
| 6,175,789 | B1 | 1/2001 | Beckert et al. |
| 6,202,008 | B1 | 3/2001 | Beckert et al. |
| 6,204,570 | B1 | 3/2001 | Muller |
| 6,282,469 | B1 | 8/2001 | Rogers et al. |
| 6,301,658 | B1 | 10/2001 | Koehler |
| 6,341,218 | B1 | 1/2002 | Poplawsky et al. |
| 6,377,825 | B1 | 4/2002 | Kennedy et al. |
| 6,421,753 | B1 | 7/2002 | Hoese et al. |
| 6,425,035 | B2 | 7/2002 | Hoese et al. |
| 6,425,036 | B2 | 7/2002 | Hoese et al. |
| 6,427,101 | B1 | 7/2002 | Diaz et al. |
| 6,430,164 | B1 | 8/2002 | Jones et al. |
| 6,452,484 | B1 | 9/2002 | Drori |
| 6,516,192 | B1 * | 2/2003 | Spaur et al. ............. 455/450 |
| 6,535,913 | B2 | 3/2003 | Mittal et al. |
| 6,577,934 | B2 | 6/2003 | Matsunaga et al. |
| 6,611,740 | B2 | 8/2003 | Lowrey et al. |
| 6,629,035 | B2 | 9/2003 | Seto et al. |
| 6,675,081 | B2 | 1/2004 | Shuman et al. |
| 6,738,854 | B2 | 5/2004 | Hoese et al. |
| 6,763,419 | B2 | 7/2004 | Hoese et al. |
| 6,765,497 | B2 | 7/2004 | Ablay et al. |
| 6,789,152 | B2 | 9/2004 | Hoese et al. |
| 6,856,820 | B1 | 2/2005 | Kolls |
| 6,868,333 | B2 | 3/2005 | Melen |
| 6,873,824 | B2 | 3/2005 | Flick |
| 6,895,310 | B1 | 5/2005 | Kolls |
| 6,954,689 | B2 | 10/2005 | Hanson et al. |
| 6,957,133 | B1 | 10/2005 | Hunt et al. |
| 6,960,990 | B2 | 11/2005 | McKibbon |
| 7,003,289 | B1 | 2/2006 | Kolls |
| 7,039,672 | B2 | 5/2006 | Wu et al. |
| 7,051,147 | B2 | 5/2006 | Hoese et al. |
| 7,072,950 | B2 | 7/2006 | Toft |
| 7,142,844 | B2 | 11/2006 | Obradovich et al. |
| 7,197,637 | B2 | 3/2007 | Schmidt et al. |
| 7,346,370 | B2 * | 3/2008 | Spaur et al. ............. 455/556.1 |
| 2002/0032853 | A1 | 3/2002 | Preston et al. |
| 2002/0097193 | A1 | 7/2002 | Powers |
| 2002/0133716 | A1 | 9/2002 | Harif |
| 2002/0143447 | A1 | 10/2002 | Miller |
| 2002/0143897 | A1 | 10/2002 | Patil |
| 2003/0005151 | A1 | 1/2003 | Ullman et al. |
| 2003/0158963 | A1 | 8/2003 | Sturdy et al. |
| 2003/0163588 | A1 | 8/2003 | Boberg et al. |
| 2004/0133668 | A1 | 7/2004 | Nicholas |
| 2004/0185842 | A1 | 9/2004 | Spaur et al. |
| 2004/0217852 | A1 | 11/2004 | Kolls |
| 2004/0267410 | A1 | 12/2004 | Duri et al. |
| 2005/0049765 | A1 | 3/2005 | Chetia et al. |
| 2005/0065678 | A1 | 3/2005 | Smith et al. |
| 2005/0075768 | A1 | 4/2005 | Nicholson et al. |
| 2005/0083929 | A1 | 4/2005 | Salo et al. |
| 2005/0102074 | A1 | 5/2005 | Kolls |
| 2005/0131595 | A1 | 6/2005 | Luskin et al. |
| 2005/0171660 | A1 | 8/2005 | Woolford et al. |
| 2005/0197747 | A1 | 9/2005 | Rappaport et al. |
| 2005/0245246 | A1 * | 11/2005 | Munch et al. ............. 455/418 |
| 2005/0245272 | A1 | 11/2005 | Spaur et al. |
| 2005/0266879 | A1 | 12/2005 | Spaur et al. |
| 2006/0235925 | A1 | 10/2006 | Rossotto et al. |
| 2007/0038764 | A1 | 2/2007 | Maillard |
| 2007/0051544 | A1 | 3/2007 | Fernandez |
| 2008/0146258 | A1 * | 6/2008 | Testone et al. ............. 455/466 |

FOREIGN PATENT DOCUMENTS

| | | |
|---|---|---|
| DE | 4032198 | 4/1992 |
| DE | 4220963 | 1/1993 |
| DE | 4300848 | 8/1993 |
| DE | 3789730 | 9/1994 |
| EP | 0242099 | 10/1987 |
| EP | 0249487 | 12/1987 |
| EP | 0292811 | 11/1988 |
| EP | 0300200 | 1/1989 |
| EP | 0392411 | 10/1990 |
| EP | 0483547 | 5/1992 |
| EP | 0494780 | 7/1992 |
| EP | 0501058 | 9/1992 |
| EP | 0509776 | 10/1992 |
| EP | 0528090 | 2/1993 |
| EP | 0617361 | 9/1994 |
| EP | 0639930 | 2/1995 |
| EP | 0649267 | 4/1995 |
| EP | 0666699 | 8/1995 |
| EP | 0699361 | 3/1996 |
| EP | 0875111 | 11/1998 |
| FR | 2721776 | 12/1995 |
| GB | 2264613 | 9/1993 |
| GB | 2288892 | 11/1995 |
| GB | 2351588 | 9/2007 |
| JP | 60-011755 | 1/1985 |
| JP | 1-503271 | 11/1989 |
| JP | 2-72042 | 3/1990 |
| JP | 3-1621 | 1/1991 |
| JP | 3-196723 | 8/1991 |

| | | |
|---|---|---|
| JP | 5-252106 | 9/1993 |
| JP | 07067174 | 3/1995 |
| JP | 7-177570 | 7/1995 |
| JP | 8-154273 | 6/1996 |
| JP | 2005-039607 | 2/2005 |
| JP | 2005-341310 | 12/2005 |
| JP | 2006-270892 | 10/2006 |
| WO | WO 89/03624 | 4/1989 |
| WO | WO 90/09645 | 8/1990 |
| WO | WO 91/02424 | 2/1991 |
| WO | WO 93/24911 | 12/1993 |
| WO | 95/08900 | 3/1995 |
| WO | WO 95/07595 | 3/1995 |
| WO | WO 95/16330 | 6/1995 |
| WO | WO 95/17077 | 6/1995 |
| WO | WO 95/31060 | 11/1995 |
| WO | WO 95/33352 | 12/1995 |
| WO | WO 96/14719 | 5/1996 |
| WO | WO 96/28947 | 9/1996 |
| WO | WO 03/053048 | 6/2003 |
| WO | WO 2006/020586 | 2/2006 |

OTHER PUBLICATIONS

"AMI Consortium Formed to Define Common Vehicle Access Standards" News From the Automotive Multimedia Interface Consortium, Dearborn, MI, Oct. 19, 1998, 2 pages.

"Can femotcells boost WiMAX?" available at http://www.wimaxvision.com/newt/1/wimaxvision/viewarticle.html?artid=20017426414, printed May 29, 2007, 2 pages.

"CellPort MSC-9710 MobileWeb Developer's Kit" CellPort Labs, Inc., Copyright 1997, 12 pages.

"Fusion Web Server" PacificSoftworksInc., date unknown, 4 pages.

"History of Communications—Internet: Common Standards" available at http://www.fcc.gov/omd/history/internet/common-standards.html, printed Jul. 31, 2006, 1 page.

"History of the Future", available at http://www.isoc.org/internet/history/brief.shtml, printed Jul. 20, 2006, 1 page.

"Motorola Unveils iRADIOtm at CES 2000; Wireless Web Access Coming Soon to a Car Near You", News, Las Vegas, NV, Jan. 6, 2000, 2 pages.

"Phoneo" available at http://www.superiorcommunications.com/products/Phoneo.aspx, Superior Communications, printed May 10, 2007, 1 page.

"Powerful New Carmaker Consorium to Create Standard Multimedia Interfaces" The Hansen Report on Automotive Electronics, vol. 11, No. 8, Oct. 1998, pp. 1-8.

"Product review: Networkcar" Telematics Update, Issue 28, Jun.-Jul. 2004, pp. 14-15.

"Sprint Goes Femto With WiMax" available at http://www.unstrung.com/document.asp?doc_id=122376&print=true, Dan Jones, Site Editor for Unstrung, Light Reading Inc., Apr. 23, 2007, 1 page.

"Sprint to Launch Samsung Femtocell", available at http://www.phonescoop.com/news/item.php?n=2146, Source: Samsung, Posted Mar. 28, 2007, 2 pages.

"Startup's dual-radio IC opens door to roaming", Electronic Engineering EETimes, Issue 1323, May 31, 2004, 3 pages.

"Telematics Suppliers Consortium Formed to Define Telematics Standards", Telematics Suppliers Consortium, Detroit, MI, Oct. 19, 1998, 2 pages.

"Windows History Internet Explorer History", available at http://www.microsoft.com/windows/WinHistoryIE.mspx, published Jun. 30, 2003, 1 page.

"Wireless Road by Vetronix" Vertronix Corporation, date unknown, 4 pages.

AB3X Cellular Interface Owner's Manual, Morrison & Dempsey Communications, Nov. 16, 1987.

Amsel: Lange Leitungen—Intelligentes Gateway fur WANs [Long lines—Intelligent gateway for WANs] in: C't Magazin fur Computertechnik, Heise-Verlag, 1992, Issue 07, pp. 86 ff.

Auslander, Edgar; IXI Mobile, Inc.; IXI Mobile Presentation; "Developing the Mobile handset: New Visions"; 20 pages.

Bilgic "A PCS terminal architecture to access multiple networks" Vehicular Technology Conference, 1996. Mobile Technology for the Human Race., IEEE 46th Atlanta, GA, USA, Apr. 28-May 1, 1996, pp. 1160-1164, XP010162572, ISBN: 0-7803-3157-5.

Brauer: Fernbedienug [Remote Control]—Remotely Possible/Sockets 1.0 in: C't Magazin fur Computertechnik, Heise-Verlag, 1995, No. 4, pp. 80 ff.

BREW, Qualcomm, About BREW®, 2 pages at http://brew.qualcomm.com/brew/en/about/about_brew.html (2002-2005).

BREW, Qualcomm, Manufacturer, 2 pages at http://brew.qualcomm.com/brew/en/manufacturer/oem.html 2003.

Clark, "Connected Cars", Extra! A Supplement to Wireless Review, date unknown, 1 page.

Cohen et al. "IP addressing and routing in a local wireless network" One World Through Comminications. Florence, May 4-8, 1992, Proceedings of the conference on Computer Communications (INFOCOM), New York, IEEE, US, vol. 2, Conf. 11, May 4, 1992, pp. 626-632m XP010062192, ISBN: 0-7803-0602-3.

Comer "Internet Protocol: Error and Control Messages (ICMP)" Internetworking with TCP/IP vol. 1, Pricipples, Protocols, and Architecture, Prentice-Hall, Inc., Copyright 1995, ISBN 0-13-216987-8, p. 123, 269, cover and inside cover.

Coviello et al., "Conceptual Approaches to Switching in Future Military Networks", pp. 1491-1498, IEEE Transactions on Communications, vol. Com-28, No. 9, Sep. 1980.

Fuchs, Axel; "Next Generation Portable Devices," Telematics Update, Dec. 2003-Jan. 2004, issue 25; pps. 11-13.

Furkukawa et al. "A self-organized reuse-partitioning dynamic channel assignment scheme with quality based power control" Personal, Indoor and Mobile Radio Communications, 1995. PIMRC'95. Wireless: Merging onto the Information Superhighway., Sixth IEEE International Symposium on Toronto, Ont., Canada Sep. 27-29, 1995, pp. 562-566, XP010150949, ISBN: 0-7803-3002-1.

Hansen, "Online Onboard: Personal Computing, Speech and The Internet in the Vehicle", Copyright 1998 by Paul Hansen Associates, Rye, New Hampshire, pp. 1-62.

Hosenfeld et al., Kommunikation ohne Grenzen—TCP/IP Informationsubermittlung im Internet [Communication without boundaries—TCP/IP Information transmission in the Internet] in: C't Magazin fur Computertechnik, Heise-Verlag, 1995l, Issue 12, pp. 330 ff.

iPod on Wheels—likelihood: 60 percent and iPhone—Likelihood: 50 percent, Business 20, p. 76 (Apr. 2005).

IXI Mobile, Inc.; IXI Personal Mobile Gateway Brochure; "Connect with Style"; 2001; 11 pages.

IXI Mobile, Inc.; IXI Personal Mobile Gateway Product Information; available at http://www.ixi.com; 13 pages.

Kane, "The HP-IL System" McGraw Hill, 1982, p. 22 and 38.

Katzela et al., "Channel Assignment Schemes for Cellular Mobile Telecommunication Systems: A Comprehensive Survey" IEEE Personal Communications, IEEE Comunications Society, US, vol. 3, No. 3, Jun. 1, 1996, pp. 10-31, XP000593925, ISSN: 1070-9916.

Kelly, S., "Mobile TV coming of age," BBC News, (Jul. 11, 2004), 3 pages available at http://news.bbc.co.uk/go/pr/fr/-/2/hi/technology/3880069.stm.

Kunze: Geheimtip—Entwickeln und Testen von Web-Projekten [Insider's tip- Developing and testing web projects] in: C't Magazin fur Computertechnik, Heise-Verlag, 1995, Issue 7, pp. 166 ff.

Leibson "The Handbook of Microcomputer Interfacing" Tab Books, Inc., 1983, p. 135 and 141.

Margolin "Smarter Stuff" Byte, Jun. 1997, 5 pages.

Motsay, "Telematics could get boost from 802.11p development" RCR Wireless News, Aug. 9, 2004, 1 page.

Napolitano et al. "UMTS all-IP Mobility Management, Call and session control Procedure"; Mar. 24, 2000; XP002149519.

Pascoe, R., IEEE Spectrum Online, "Building Networks on the Fly" 5 pages, (Feb. 28, 2001) available at http:/www.spectrum.ieee.org/WEBONLY/publicfeature/mar01/net.html, printed Jan. 19, 2005.

Pascoe, R., The Salutation Consortium, "Geographic Computing: Enabling New Markets for Hand Held and Palm-Size Information Appliances: A Salutation White Paper," 14 pages, (Dec. 16, 1998).

Perkins "Mobile IP" IEEE Communications Magazine, May 1997, 12 pages.

Qualcomm, Wireless Business Solutions, "Presentation to the IWPC Workshop"; date unknown.

Richard, III, G.G., IEEE Internet Computing, "Service Advertisement and Discovery: Enabling Universal Device Cooperation," pp. 18-26 (Sep.-Oct. 2000).

Stuckenberg: Labyrinth—Routing-Verfahren in Wide-Area Networks [Routing methods in wide area networks] in: C't Magazin fur Computertechnik, Heise-Verlag, 1994, No. 11, p. 238 ff.

Swasey "Padcom Intros Data Technology Laptop Users Can Receive Data Over Different Networks", date unknown, 1 page.

Talbot "Soul of a New Mobile Machine" Technology Review, May/Jun. 2007, p. 46-53 and cover.

Toshiba announces Ubiquitous Viewer software, MobileTracker, 1 page at http://www.mobiletracker.net/archives/2005/01/18/toshiba-pc-control, (2003-2005).

van den Broeck, J., "Pushlets—Whitepaper," Just Objects B.V., 16 pages at http://www.pushlets.com/doc/whitepaper-all.html, (2002).

van den Broecke, J., "Pushlets: Send events from servlets to DHTML client browsers," JavaWorld, 15 pages at http://www.javaworld.com/javaworld/jw-03-pushlet_p.html, (Mar. 2000).

Varrall, "The Impact of the Internet on Wireless Networks", Shosteck Cellular//PCS Strategies newsletter, date unknown, 3 pages.

Wildstrom, S.H., "Coming Soon: Mobile Couch Potatoes," Business Week, p. 22 (Mar. 28, 2005).

Wright et al., TCP/IP Illustrated vol. 2: The Implementation, Addison-Wesley Professional Computing Series, Mar. 1996, pp. 63-74.

Zeman, "Ubi, I Be, We Be Screaming For Samsung's UbiCell Femtocell", available at http://www.informationweek.com/blog/main/archives/2007/03/ubi_ibe_webe_sc.html;jses..., Mar. 30, 2007, 2 pages.

International Search Report for International (PCT) Patent Application No. PCT/US98/00507, mailed Jun. 24, 1998, 4 pages.

International Preliminary Examination Report for International (PCT) Patent Application No. PCT/US98/00507, mailed Apr. 14, 1999, 5 pages.

Examiner's First Report for Australian Patent Application No. 59595/98, mailed Oct. 24, 2001, 2 pages.

Notice of Acceptance for Australian Patent Application No. 59595/98, mailed Feb. 26, 2002, 2 pages.

European Search Report for European Patent Application No. 98902787.5-2412, completed Jul. 4, 2002, 6 pages.

Office Action for European Patent Application No. 98902787.5-2412, mailed Nov. 6, 2002, 9 pages.

Author unknown, Further Office Action for European Patent Application No. 98902787.5-2412, dated Sep. 15, 2003, 5 pages.

Author unknown, Further Office Action for European Patent Application No. 98902787.5-2412, mailed Jan. 18, 2005, 3 pages.

Notification of Reasons for Refusal for Japanese Patent Application No. 10-530369, forwarding date Aug. 26, 2003, 2 pages.

"Certified Notice of Allowance" for Japanese Patent Application No. 10-530369, forwarding date Feb. 3, 2004, 2 pages.

International Search Report of International (PCT) Patent Application No. PCT/US98/22598, mailed Mar. 12, 1999, 5 pages.

Official Action for U.S. Appl. No. 08/778,897, mailed Apr. 6, 1999, 11 pages.

Notice of Allowance for U.S. Appl. No. 08/778,897, mailed Nov. 30, 1999, 7 pages.

Official Action for U.S. Appl. No. 09/588,282, mailed Jan. 2, 2002, 7 pages.

Notice of Allowance for U.S. Appl. No. 09/588,282, mailed Sep. 9, 2002, 4 pages.

Official Action for U.S. Appl. No. 08/957,652, mailed Mar. 17, 1999, 12 pages.

Restriction Requirement for U.S. Appl. No. 12/017,467, mailed Aug. 3, 2010, 7 pages.

Examination Report for European Patent Application No. 08 012 831.7 mailed Apr. 6, 2010, 4 pages.

Momal et al., "Using World-Wide_Web for control systems" Proceedings of the 1995 International Conference on Accelerator and Large Experimental Physics Control Systems, Chicago, Illinois, Oct. 30-Nov. 2, 1995, pp. 62-67.

Taylor et al. "Telerobot on the World-Wide-Web", Proceedings of Robots for Australian Industries conference, Australian Robot Association, Melbourne, pp. 108-120.

Goldberg et al., "Beyond the web: Manipulating the Real World", Computer Networks and ISDN Systems, 1995, pp. 209-219.

First Office Action Issued by European Patent Office in Application No. 04 706 066.0-2421, Sep. 9, 2008, pp. 1-8.

First Office Action issued by European Patent Office for European Patent Application No. 05 759 479.8-1244, Oct. 21, 2008, p. 1-8.

European Search Report in International Patent Application No. EP08012831, mailed Dec. 18, 2008, pp. 1-5.

Official Action in International Patent Application No. EP08012831, mailed Apr. 14, 2009, 1 page.

English language translation of Official Action for Japanese Patent Application No. 2007-198355, mailed Jan. 12, 2010, 3 pages.

Official Action for U.S. Appl. No. 12/017,467, mailed Dec. 9, 2010, 17 pages.

Invitation pursuant to Article 94(3) and Rule 71(1) EPC, mailed Feb. 17, 2011, 4 pages.

Duri et al., "Framework for Security and Privacy in Automotive Telematics", WMC '02, Sep. 28, 2002, Atlanta, Georgia, Copyright 2002 ACM, 8 pages.

* cited by examiner

COMMUNICATION CHANNEL SELECTION AND USE

FIELD

The present invention is related to communicating information including data over one or more selected network channels.

BACKGROUND

Communication devices capable of communicating over a number of different communication links or channels are available. For example, personal computers are capable of connecting to communication servers or other endpoints using wired Ethernet connections, Wi-Fi or other wireless Ethernet or other protocols, the public switched telephony network (PSTN), including via common telephone lines and high speed digital subscriber line (DSL) connections, high speed cable network connections, and hybrid connections, for example, using connections established over the PSTN for requesting and uploading data and using connections established over a satellite based network for downloading data. While desktop computers and other devices used at fixed locations typically select one available communication channel to support communications with other devices, mobile devices may use different communication channels at different times and locations. In addition, a communication device may use different communication channels in support of different applications. For example, a personal digital assistant or handheld computer might use a first network to support realtime voice communications, a second network for email and instant messaging communications, and a third network for Internet browsing.

Portable or mobile telephones, such as cellular telephones, are in widespread use. Many portable telephones are capable of using different communication channels at different times and/or locations. For example, such devices may support analog and digital realtime voice communications, but will only use an analog channel for a communication when the primary digital channel is unavailable. Similarly, phones that support different digital communication protocols available in different geographic regions are available. Wireless communication providers have also developed systems for providing network coverage in areas that are otherwise poorly served. For example, so-called nano cell and femto cell devices for providing wireless network coverage in office buildings or homes are now available. These systems provide an alternative to macro cells, and are particularly useful in areas where coverage from such macro cells is poor or non-existent.

As use of mobile telephones has become more common, many consumers have abandoned the use of landline telephones. However, the exclusive use of mobile telephones can result in increased costs and decreased service levels for the user. In response to the demand for a single device that can provide portability, high quality, and the ability to access low cost networks, devices have been developed that can achieve fixed mobile convergence (FMC), or the connection of a mobile telephone to a fixed network infrastructure. Devices capable of providing FMC typically are used on the long range cellular network when the user desires or requires portability, and the fixed network infrastructure when a low cost, high speed and/or high quality connection is desired. For example, a device might provide support for 3G cellular network service for the convenience of connecting to a cellular network, and support for Wi-Fi or Bluetooth connections for connecting to the fixed network infrastructure through a wireless access point (WAP).

Where multiple communication links are available to a communication device, systems have been described that allow the communication device to make a logical choice from among the available communication channels. For example, U.S. Pat. Nos. 6,122,514 and 6,516,192, assigned to the assignee of the present disclosure, provide systems for selecting an acceptable network channel using application requirements for the particular channel and channel operating parameter values. The entire disclosures of U.S. Pat. Nos. 6,122,514 and 6,515,192 are hereby incorporated herein by reference.

As use of the Internet has become more common, portable and other devices that allow access to the Internet have also become more common. However, the connections to the Internet provided by such devices are often expensive and slow. As is familiar to any user of the Internet, a typical web page is made up of a number of component parts. Some of these components can be of more interest to the user than others. For example, one or more items of information returned as part of a request for a web page may comprise advertising, while one or more other items of information may contain desired information. In addition, some components may comprise a greater amount of data than other components, and therefore may require longer download times and/or a greater share of communication link resources than others. As a result, a user may have to wait a relatively long period of time before being presented with desired content. Therefore, it would be desirable to provide a system that could distinguish between different items of information, and/or allow for different items of information to be retrieved using different communication links, including using different communication links connected to the same target address or source of content simultaneously.

SUMMARY

Embodiments of the present invention provide for the selection of a different communication channel or link for different pieces of information comprising a request for content. Other embodiments of the present invention also provide for the simultaneous use of multiple communication channels or links in connection with obtaining component parts of requested content.

In accordance with embodiments of the present invention, a request for selected content produced by or in association with a communication application running on a first processing platform is directed to a request mapper application or module. The request mapper application, which may be running on the first processing platform or on a second processing platform, analyzes the request and in particular the component parts of the request. As a result of the analysis, each of the items of information included in the requested content are characterized. This characterization may include categorization or prioritization. The request mapper application informs a link selection application of the characterization of each of the items of information. The link selection application selects an appropriate communication channel or channels for use in obtaining the items of information. In accordance with embodiments of the present invention different items of information may be obtained using different communication channels. In addition, different items of information can be obtained over different communication channels simultaneously.

In accordance with embodiments of the present invention, the characterization of items of information can include determining a type of content, such as whether the content comprises text, graphics, sounds, multimedia or other content. Metadata suggesting or directing a categorization or prioritization to be applied to one or more items of information can also be used to provide a characterization of items. Alternatively or in addition, embodiments of the present invention may characterize items of information based on the nexus or relevance of each item of information to the requested content. Accordingly, items of information that are central to the requested content can be characterized differently than peripheral or unrelated items.

The link selection application can apply the characterization of items of information included in a request for content in assigning a communication channel for use in obtaining those items of information. For example, items of information that are central to the requested content or that have otherwise been assigned a high priority can be requested from a target address before peripheral or unrelated items of information are requested from that address. Alternatively or in addition, an item of information that is central to the requested content or that has a high priority can be obtained using a communication link that is faster and/or more reliable than other communication links. Items of information that are assigned a lower priority can be obtained after higher priority items of information and/or using a communication link that is less expensive than other available links. In addition, the link selection application can defer obtaining items of content having a low priority, for example in response to a low battery status. Accordingly, the state of the communication device, including parameters such as but not limited to battery power, available memory, and differential network costs, can be taken under consideration in selecting or scheduling a communication link for use with respect to items of information. Embodiments of the present invention can also provide multithreaded operation in which different items of information associated with a single request for information from a single target address are obtained over different communication links simultaneously.

Additional features and advantages of embodiments of the present invention will become more readily apparent from the following discussion, particularly when taken together with the accompanying drawings.

DETAILED DESCRIPTION

Figure 1:
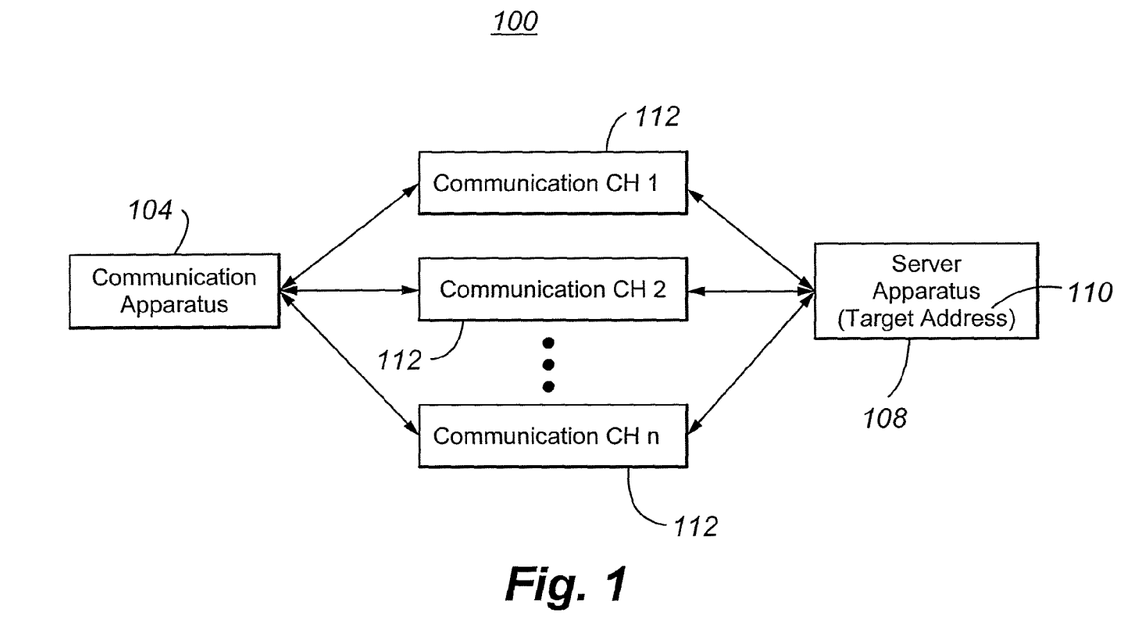
FIG. 1 is a block diagram depicting components of a system in accordance with embodiments of the present invention.

FIG. 1 illustrates components of a system 100 in accordance with embodiments of the present invention. These components generally include a communication apparatus 104. In general, the communication apparatus or means for enabling communications 104 may be operated to request content containing a plurality of items of information for use by the communication apparatus 104 or an associated user or device. The server apparatus 108 operates as the source of the content and the associated plurality of items of information. As used herein, requested content is associated with a single target address 110 that identifies the server apparatus 108. In addition, each of the items of information comprising requested content are also associated with the target address 110 of the server apparatus 108. Requests for content and the items of information included therein are transmitted from the communication apparatus 104 to the server apparatus 108 over one or more communication channels or links 112. As described herein, a particular communication channel 112 may be selected for use in requesting and receiving a particular item of information.

A communication apparatus 104 generally comprises a processor, memory, interfaces and operating software or instructions capable of supporting different communication channels 112 and of running applications or modules associated with the assignment of items of information to selected communication channels 112 as described herein. Examples of a communication apparatus 104 include a wireless telephone, such as a cellular telephone, a personal digital assistant (PDA), a handheld computer, a laptop computer, a desktop computer or any other device capable of supporting requests for information and the delivery of information over one or more communication channels selected from a plurality of communication channels 112. Moreover, a communication apparatus 104 can run various operating systems, such as MICROSOFT WINDOWS, MICROSOFT WINDOWS MOBILE, various distributions of LINUX, and SYMBIAN, and can support various runtime environments, such as JAVA and BREW. A server apparatus 108 in accordance with embodiments of the present invention may comprise any source of content or a service comprising items of information associated with a target address 110. The server apparatus 108 may comprise a number of devices, provided that all of the included devices are associated with the same target address 110. The server apparatus 108 is interfaced to a plurality of communication channels 112 that are in turn connected to a communication apparatus 104. Moreover, the server apparatus 108 is capable of responding to a request for information and delivering such information to a requesting communication device 104.

The plurality of communication channels 112 may comprise communication channels established over different networks and/or using different protocols. Examples of communication channels 112 include wireline Ethernet connections, any of the various IEEE 802.11 wireless protocols, cellular packet data, WIMAX, ultrawide band, Bluetooth, infrared, video broadcast, digital video broadcast handset (DVBH), any protocol capable of addressing specific interfaces independently of the transport technology, or any wireline or wireless communication link capable of supporting the request and delivery of information between a communication device 104 and a server apparatus 108 at a target address 110. In addition, a communication channel 112 typically, although not necessarily, is established at least partially across the Internet.

Figure 2:
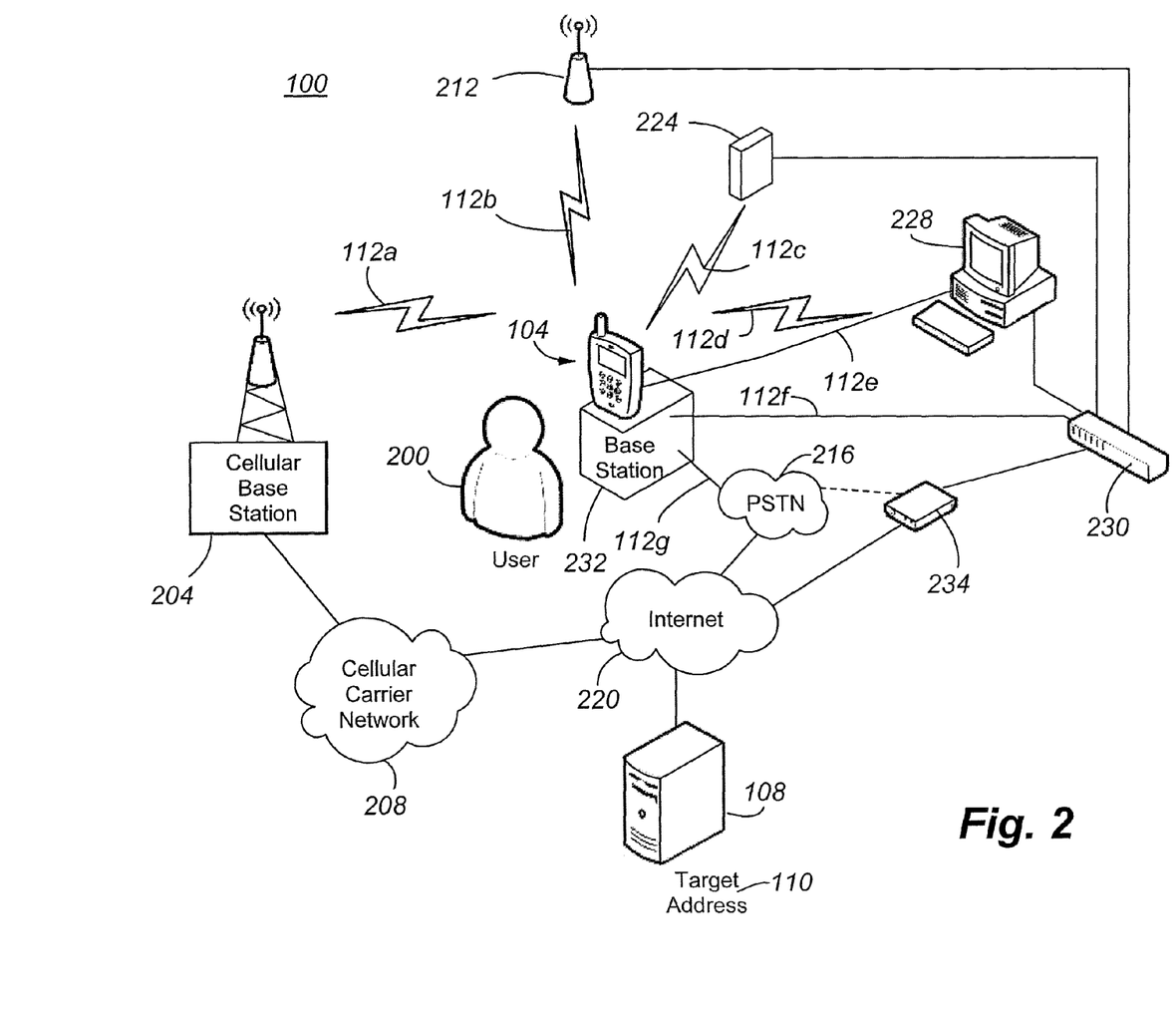
FIG. 2 depicts the interrelation of components in an exemplary system in accordance with embodiments of the present invention.

FIG. 2 is an illustration of a system 100 in accordance with embodiments of the present invention including a number of example communication channels 112 capable of supporting communications between a communication apparatus 104 and a server apparatus 108 associated with a target address 110. More particularly, FIG. 2 illustrates examples of communication devices or equipment that can provide at least an initial portion of a communication channel 112 capable of supporting communications between a communication apparatus 104 and a server or source of information 108 associated with a target address 110.

As illustrated in FIG. 2, the communication apparatus 104, which is typically associated with a user 200, may comprise a portable, hand-held device, such as a cellular telephone, handheld computer or personal digital assistant (PDA). Therefore, one example of a communication channel 112 that can be utilized by the communication apparatus 104 includes a communication channel 112a established between the communication apparatus 104 and a cellular telephone network base station 204. The cellular base station 204 is generally connected to a cellular carrier network 208, and from there to the public switched telephony network (PSTN) 216 and/or the Internet 220. Accordingly, the communication channel 112a may comprise communications between a communication apparatus 104 and a cellular macro cell, provided as part of or in connection with a cellular telephony and/or data network 208.

Another example of a communication channel 112 that may be utilized by a communication apparatus 104 includes a communication channel 112b between the communication apparatus 104 and a nano or femto cell base station 212. In general, a nano or femto cell base station 212 is provided to augment or expand a cellular telephone network's coverage within a specific site or geographic area. For example, a nano or femto cell base station 212 may be deployed within an office building or a home to provide cellular network coverage that might otherwise be unavailable, to improve the quality of such coverage, or to provide coverage at a lower radio transmission power. A nano or femto cell base station 212 is typically interfaced to a cellular carrier network 208 and/or the public switched telephony network (PSTN) 216 via a wired connection to the Internet 220. However, other configurations are possible. For example, a nano or femto cell base station 212 can be interconnected to a cellular carrier network 208, the PSTN 216 and/or the Internet 220 via a wireless relay channel.

Another example of a communication link that may be established in connection with a communication apparatus 104 is a wireless Ethernet link such as a Wi-Fi or other link established in connection with any of the various IEEE 802.11 protocols. Accordingly, such a communication link 112c may be established wirelessly between the communication apparatus 104 and a wireless access point (WAP) or hot spot 224. In a typical implementation, the wireless access point 224 is in communication with the Internet 220 over a wireline connection.

Still another example of a wireless communication link is a communication link 112d established according to a short range wireless protocol, such as the Bluetooth protocol. For example, a Bluetooth radio provided as part of the communication apparatus 104 may be in communication with a Bluetooth radio in another device, such as a personal computer 228. The other device or personal computer 228 is typically interconnected to the Internet 220 via wireline connections, for example through a switch 230 and a DSL, PSTN or cable modem 234, or through a wireless connection, such as a connection to a Wi-Fi hot spot.

Embodiments of the present invention may also make use of communication links 112 established using wireline connections to the communication apparatus 104. For example, a universal serial bus (USB) communication channel 112e may be established between the communication apparatus 104 and another device, such as a personal computer 228. The other device or personal computer 228 may then be interfaced to the Internet 220, for example using further wireline connections.

Another example of a wireline connection to a communication apparatus 104 that can be used to provide a communication link is a wired Ethernet communication channel 112f. Still another example of a wired connection to a communication apparatus 104 is a communication channel comprising a wired plain old telephony system (POTS) or digital subscriber line (DSL) connection 112g between the communication apparatus 104 and the PSTN 216, which may then provide access to the Internet 220, for example through an Internet service provider (ISP).

In addition or as an alternative to supporting different communication channels 112 through interfaces provided directly by the communication apparatus 104, the communication apparatus 104 may be associated with a docking station or other interfacing device 232. In general, a docking station 232 may provide an interconnection to the communication apparatus 104, and access to various communication interfaces, such as ports for establishing wireline communication links 112, and radios for establishing wireless communication links 112. According to such embodiments, the docking station 232 may be interconnected to the communication apparatus 104 using a proprietary or universal communication interface.

Accordingly, it can be appreciated that a communication apparatus 104 can utilize a variety of communication links 112 in order to establish communications with a server device 108 at a target address 110. These different communication links 112 generally provide different advantages and disadvantages. For example, a communication channel 112b involving a femto cell base station 212 may require less battery power and provide a higher speed connection at high reliability but also at a high cost, while a communication channel 112c to a Wi-Fi device 224 may require more battery power, a comparable speed, but at lower cost. As will become apparent from the present description, different items of information requested from a target address 110 by or in association with the communication apparatus 104 can advantageously be assigned to different communication channels 112 according to how the different items of information are characterized and according to the different costs and benefits associated with use of the different communication channels 112.

Figure 3:
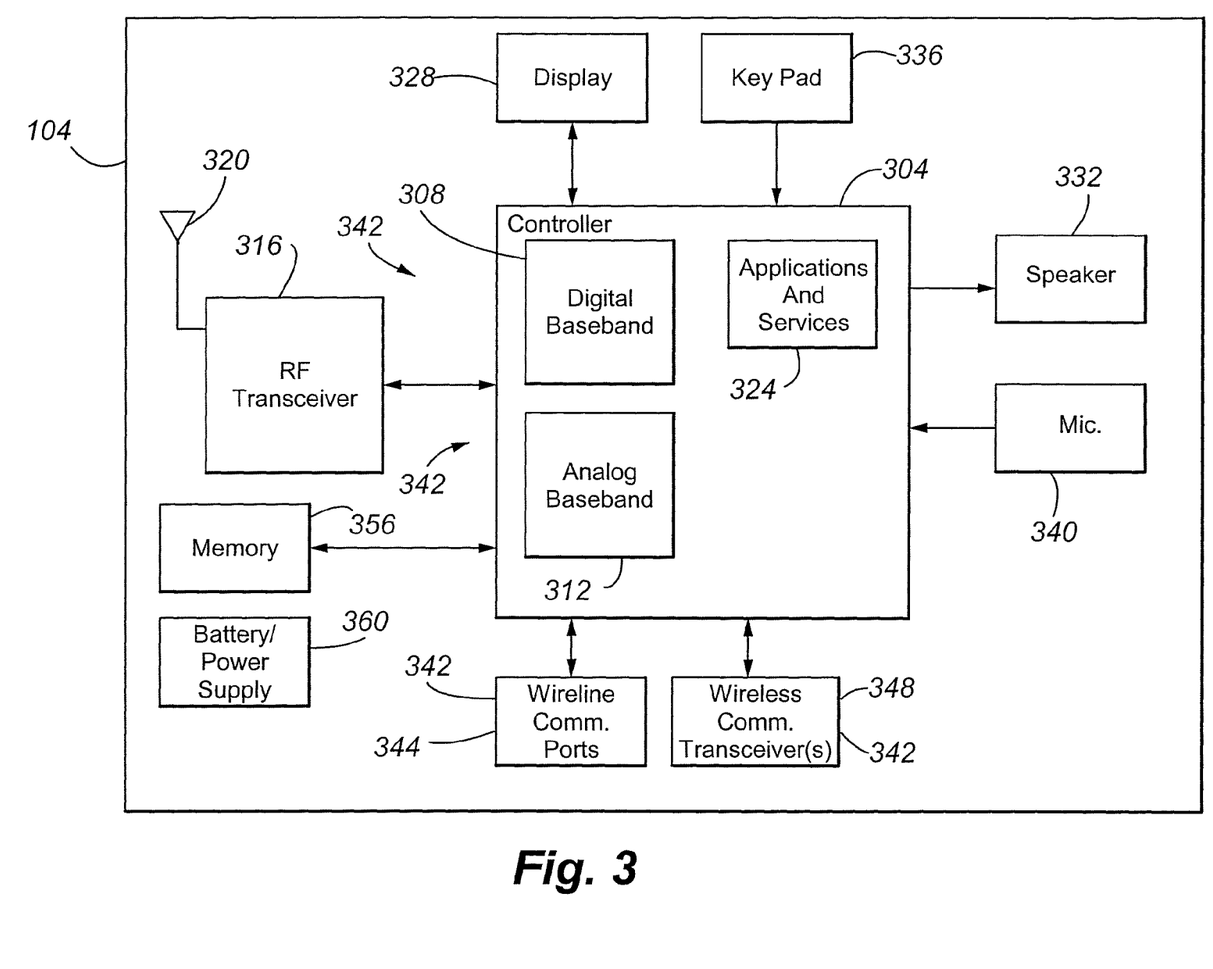
FIG. 3 is a block diagram depicting components of a communication apparatus in accordance with embodiments of the present invention.

A block diagram depicting components of a communication apparatus 104 in accordance with embodiments of the present invention is illustrated in FIG. 3. More particularly, the exemplary communication apparatus 104 depicted in FIG. 3 comprises a cellular telephone or PDA. However, it should be appreciated that embodiments of the present invention are not limited to use in association with such devices. The communication apparatus 104 includes a controller 304. The controller 304 generally provides a processor and memory for use in association with providing various communication apparatus 104 functions, including a communication channel selection function as described herein. In addition, the controller 304 is interconnected to a number of other components.

As depicted in the figure, a number of different modules or services can be provided by the controller 304. These include a digital baseband module 308 for providing digital radio services. Examples of such digital radio services include global system for mobile communications (GSM), code-division multiple access (CDMA), evolution data only/optimized (EVDO), enhanced data rates for global evolution (EDGE) and high speed download packet access (HSDPA) systems.

Moreover, the digital baseband module 308 can provide support for a number of different digital radio services. The controller 304 can also provide an analog baseband module 312 for providing analog radio services. Examples of such analog radio services include advanced mobile phone service (AMPS), and narrowband analog mobile phone service (NAMPS) systems. The analog baseband module 312 can provide support for a number of different analog radio services. Both the digital baseband module 308 and the analog baseband module 312 operate in association with a radio frequency transceiver 316 and antenna 320 to provide one or more wireless communication links 112 that include the communication apparatus 104 as a communication endpoint.

The controller 304 also operates in association with the provision of applications and services 324. The applications and services 324 can include a set of instructions or code, such as a driver, to provide output to a user 200 through a display 328. For example, the display 328 can be used to display operating information related to the communication apparatus 104 itself, a communication link 112, or content that has been provided to the communication apparatus 104 from a server apparatus 108 associated with a target address 110. The applications and services 324 can also support the provision of audible information to a user 200 through a speaker or headphones 332. For example, the speaker 332 can be used to provide audible information received over a communication link 112 as part of a telephone call in which the communication apparatus 104 is functioning as an endpoint. The speaker 332 can also be used to provide audible information, for example in association with the provision of content that has been delivered to the communication apparatus 104 from a server apparatus 108 associated with a target address 110.

The applications and services 324 can also provide functions to support the receipt of information from the user 200. For example, selections or data made by a user through a display 328 comprising a touch screen, or through a keypad or keyboard 336, can be handled by one or more of the applications or services 324. Moreover, selections or data entered by a user 200 can include requests for the delivery of content to the communication apparatus 104. As a further example, the applications and services 324 can handle the receipt of audible information from a microphone 340, including speech provided by a user in connection with voice communications or commands. Accordingly, it can be appreciated that embodiments of the present invention allow information to flow from the communication apparatus 104 to a server apparatus associated with a target address.

The applications and services 324 can also provide functions in support of communications using various interfaces or ports 342. These interfaces 342 can include wireline communication ports 344 and wireless communication ports 348. For example, and without limitation, the applications and services 324 can provide protocols and signals necessary for supporting the various communication links 112 that are established through interfaces 342 associated with one of the wireline communication ports 344, wireless communication ports 348, such as USB, Ethernet, Bluetooth, Wi-Fi, and IrDA and/or through the digital 308 or analog 312 basebands and the RF transceiver 316. The applications and services 324 can also operate to support communications, such as data communications performed using the digital 308 or analog 312 baseband and the RF transceiver 316. In general, a communication link 112 established using a wireless communication port 348 is distinguished from a communication link 112 established through the RF transceiver 316 in that the wireless communication port 348 typically supports shorter range, lower power communication links 112 only, while the RF transceiver 316 is usually capable of supporting longer range communication links 112.

The controller 304 also provides or supports the operation and execution of applications and services 324 comprising user applications or modules. In general, these user applications or modules comprise code or instructions that are stored in memory on or in association with the controller 304 and that are executed by the controller 304. The applications 324 can include applications that provide services to the user 200. Examples of applications 324 include communication applications, such as an Internet browser or a voice over Internet protocol (VoIP) telephony application. Other examples of applications 324 include a request mapper module and a link selection module as described herein. Still other examples include user applications, such as productivity or entertainment applications.

As can be appreciated by one of skill in the art, a communication apparatus 104 can also include various other components or features. For example, although the controller 304 typically includes integrated memory, additional memory 356 can be provided. This memory 356 can include solid state memory that is provided as a removable memory card. Alternatively or in addition, the memory 356 can include memory that is not intended to be removable by the user 200. The memory 356 can include solid state memory, magnetic storage, such as a hard disk drive, optical storage, or any other storage device or storage medium in combination with a reader. In addition, a communication apparatus 104 typically includes a battery or power supply 360. In particular, a communication apparatus 104 may include a battery 360 or other source of power, such as a fuel cell, to support mobile or wireless operation of the communication apparatus 104.

Figure 4:
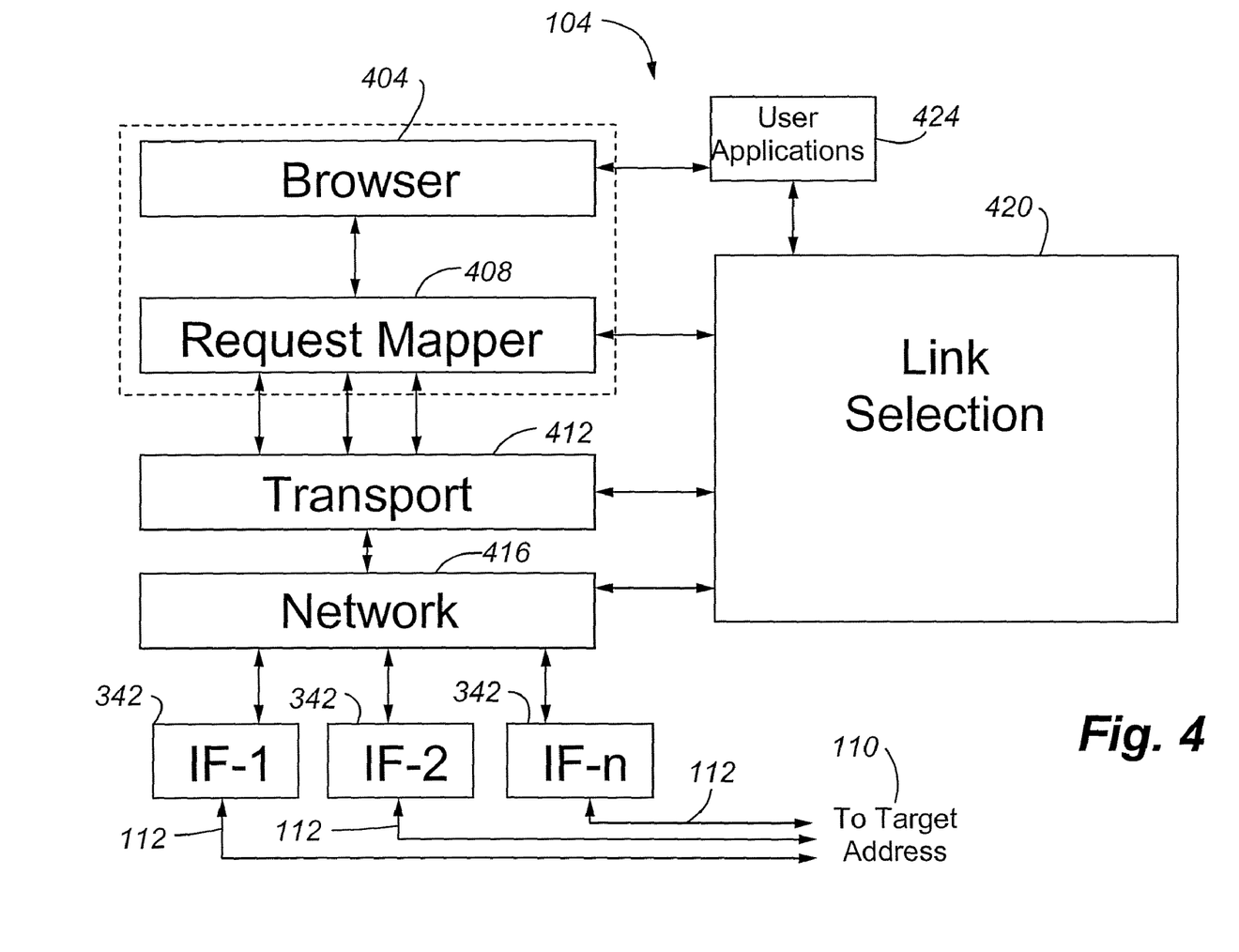
FIG. 4 is a block diagram depicting portions of a communication apparatus associated with selecting a communication channel in accordance with embodiments of the present invention.

FIG. 4 is a functional block diagram depicting components of a communication apparatus 104 operable in connection with selecting a communication channel 112 for use in obtaining items of information in accordance with the embodiments of the present invention. The depicted components include applications and services 324 such as a communication application or Internet browser 404, and a request mapper module or application 408. Other specific applications and services 324 that may be provided include a conventional transport layer service module or application 412, and a conventional network interface service module or application 416. As can be appreciated by one of skill in the art, the transport layer service module 412 can implement any one or more of the various available protocols, such as the transmission control protocol (TCP) and the user datagram protocol (UDP). As can also be appreciated by one of skill in the art, the network interface service module 416 generally comprises the Internet protocol portion of the TCP/IP stack formed by the transport layer service module 412 and the network interface service module 416, and generally operates to address and frame outgoing packets of data, or to receive incoming packets of data. Accordingly, the network interface service module 416 generally comprises a network layer. In addition, a link selection module or application 420 is provided. A plurality of communication interfaces 342 support different communication links 112. The communication apparatus 104 may also include various user applications 424. Although shown as separate applications or modules, various of the components can be combined. For example, the request mapper module or application 408 and/or the link selection module or application 420 can be integrated into the communication application 404.

As can be appreciated by one of skill in the art, a communication application 404 such as an Internet browser running on a communication apparatus 104 can be used as an originating agent in association with a request for information or content from a server apparatus 108, and can comprise a means for collecting content from a target and for generating a list of items of information included in a request. As can also be appreciated by one of skill in the art, most content requested from Internet websites comprises multiple elements or items of information. Therefore, in collecting requested content, multiple requests for the component items of information are typically made. Some of these items of information are central to the request for content, and are of great interest to the user 200. An example of a central item of information is a body of text comprising the subject of a requested page of content. Other content is peripheral or unrelated to the requested content. An example of a peripheral or an unrelated item of information is an advertisement.

Typically, a request for content is initiated when a user 200 (or an application 324) enters (or provides) a uniform resource locator (URL) identifying the server apparatus 108. As can be appreciated by one of skill in the art, as used in this context, a server apparatus 108 is a source of the requested content, and is not necessarily a single server or other device. For example, the server apparatus 108 identified by a uniform resource locator can comprise a server farm or other collection of devices. The URL is sent to a domain name server on the Internet 220 or some other authority in association with a request message, such as an HTTP "Get" to request a representation of the resource comprising the requested content. In response to a "Get" request addressed using a URL, the domain name server typically returns an IP address for the target address 110 of the server apparatus 108. A socket is then established between the communication apparatus 104 and the target address 110. As can be appreciated by one of skill in the art, a socket generally comprises a number of parameters, including a port number and an IP address that identify the end points of a communication channel 112 established over the Internet.

Once a socket between the communication application 404 and the target address 110 is established, the server 108 at the target address 110 returns an index or .htm page that represents the requested content or that comprises a main page that the server 108 assumes the requestor desires. The basic page that is returned can comprise a stream of bits representing hypertext markup language (HTML) code comprising the requested page or content. The browser application 404 parses this code and creates a list of the individual items of information that comprise the complete page or content. Each item of information included in the requested content shares a common target address 110, but is separately identified under that target address 110. The communication application 404 may then build a document object model (DOM) representing the items of information included in the requested content. The communication application 404 in a conventional implementation would then begin sending individual requests to the target address 110 in series over a single communication channel 112 to obtain the items of information in series over that single communication channel 112.

Figure 5:
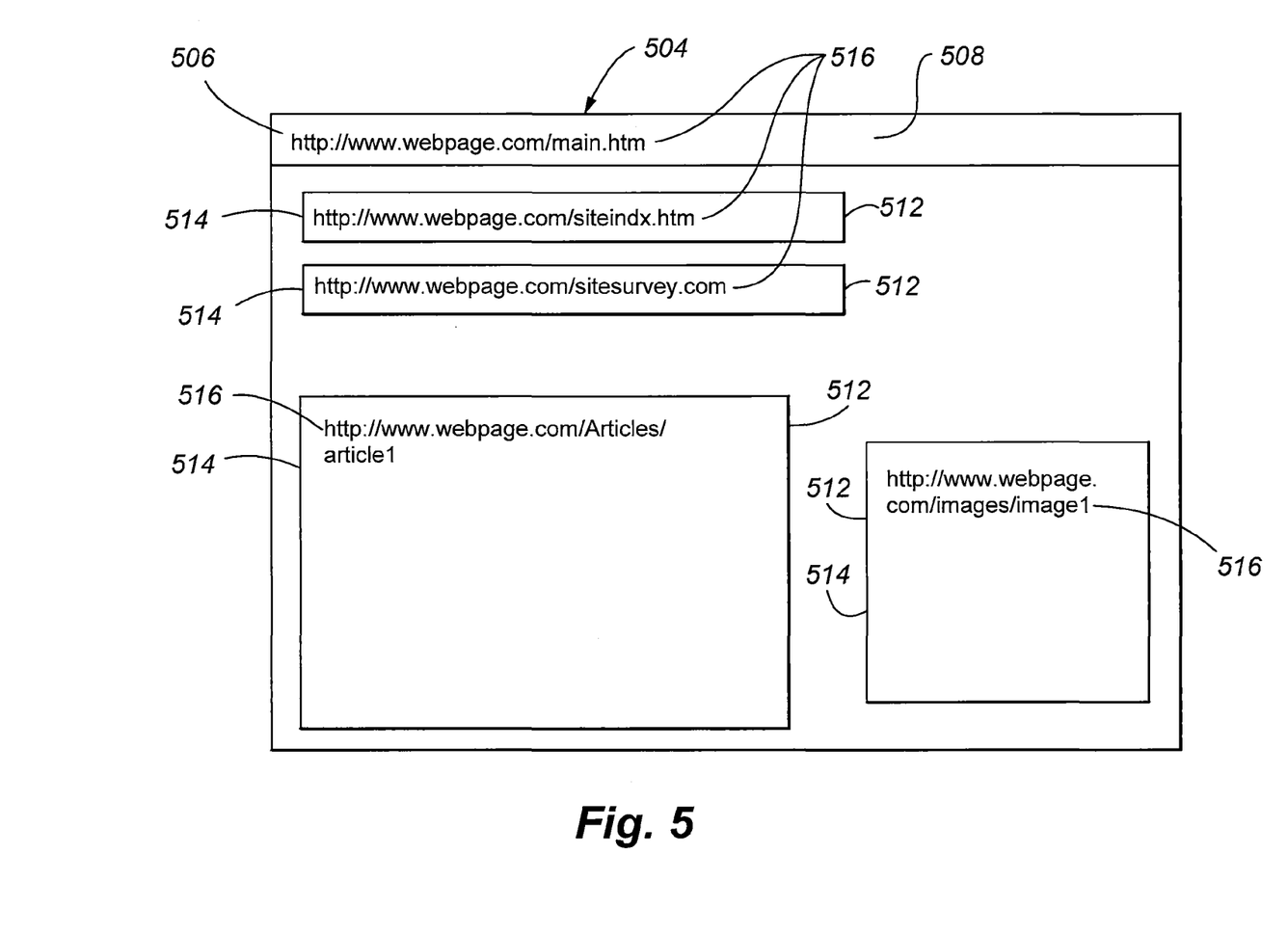
FIG. 5 illustrates an example web page and items of information included therein.

An example web page 504 is depicted in FIG. 5. This web page or collection of content 504 is the subject of a request for content that has been made by the browser or communication application 404. The requested page 504 is associated with a URL 506, which appears in the title bar 508 of the browser 404 window. The page 504 includes a number of items of information 512 comprising elements 514 of the requested page 504. Each item of information 512 is associated with its own identifier. For purposes of illustration, the identifier 516 for each of the different items of information 512 is shown in the figure, although it can be appreciated by one of skill in the art that such identifiers 516 are usually not displayed to a user 200 during normal operation of a browser 404. As is evident from these example identifiers 516, each one shares a common root that corresponds to the URL 506, and therefore to the target address 110 of the origin server apparatus 108. Accordingly, it can be appreciated that each of the items of information 512 is identified as an individual collection of information within the larger collection of content 504 that has been requested from the target address 110.

A communication application 404 operating conventionally would generally send requests for information and receive the requested information over a single communication channel 112 in the order in which the items of information 512 are listed by the main page or in the DOM. In contrast, embodiments of the present invention allow different items of information to be requested and received over different communication channels 112. Embodiments of the present invention also allow the order in which the items of information are requested and received to be altered according to a determined relative priority of the items of information included in a content request. In addition, while items of information are requested and received by a communication application 404 operating conventionally in series, embodiments of the present invention allow a plurality of items of information 512 to be obtained by a communication apparatus 104 simultaneously, using a plurality of communication channels 112.

In accordance with embodiments of the present invention, the ability to assign different items of information 512 to different communication channels 112, to reorder individual items of information 512 and/or to simultaneously request and obtain multiple items of information 512 from a single target address 110 is enabled by the provision of a request mapper application or module 408 and a link selection application or module 420. The request mapper application or means for assigning a priority to items of information 408 is interposed between the communication application 404 and the communication network interfaces 342. Accordingly, the request mapper 408 can intercept individual requests for items of information 512 included in an overall page or collection of content 504, and characterize each of those requests individually. In accordance with embodiments of the present invention, this is achieved by providing a port on the request mapper 408 to which all requests by the communication application 404 are directed. For example, the request mapper 408 can operate to prioritize or categorize the different items of information 512 included in the requested content 504 and represented by individual requests. In addition, the request mapper 408 can characterize a request for an item of information 512 by communication requirements associated with the request (or the requested information). These communication requirements can include required communication link 112 parameter values, such as bandwidth, cost of transfer, power requirement and parameters related to the quality of the packet transfer, including packet loss, packet latency and packet jitter. The requirements may also include a security level requirement. In addition, the communication requirements may include a "weighting vector" for each parameter. The value of the weighting vector can be different for different items of information. In general, a weighting vector acts as an indicator of the weight to be applied to a particular parameter, in comparison with the weight that is to be given to other parameters. By way of example, a cost requirement may be given ten times the weight of a bandwidth requirement, thereby indicating that, for an associated item of information, the cost of transmission is to be given significantly greater weight in deciding which of the communication channels is to be selected than is the bandwidth parameter.

The link selection application 420 or means for assigning communication channels 112 to items of information 512 is an application or module running on the communication device 104 or on an associated processing platform. In general, the link selection application 420 is provided with a vector or a set of communication requirements associated with each request for information by the request mapper application 308. The link selection application 420 evaluates the communication requirements and checks the communication links 112 that are available through the network interfaces 342 to determine which of the available communication links 112 is the most appropriate for the item of information 514 under consideration. The link selection application 420 is additionally interconnected to the transport layer 412 and network interface service module 416, and through these connections can direct the use of different communication links 112 for different requests for information and the return of such information to the communication apparatus 104.

As can be appreciated by one of skill in the art, the transport layer 412 regulates the transfer of information between the communication application 404 (via the request mapper 408) and the network layer 416. The transport layer 412 can utilize available protocols, such as the transmission control protocol (TCP) and the user datagram protocol (UDP). The network layer or Internet layer 416 in turn regulates the transfer of information between the transport layer 316 and the network interfaces 342. The network interfaces 342 generally provide the physical link between the communication apparatus 104 and the communication channels 112. In accordance with embodiments of the present invention, no modifications to conventional transport layer 412 or network layer 416 components are necessary.

The link selection application or module 420 is provided with information related to the available communication channels 112 by the network interface service module or layer 416. The provided information can include availability, performance, type, load and other information. In addition, the link selection application 420 receives information provided by the request mapper 408 application regarding the individual requests for information that have been issued from or in association with the communication application 404. The information related to the individual requests for information can include a characterization of each of those requests provided by the request mapper application 408.

Figure 6:
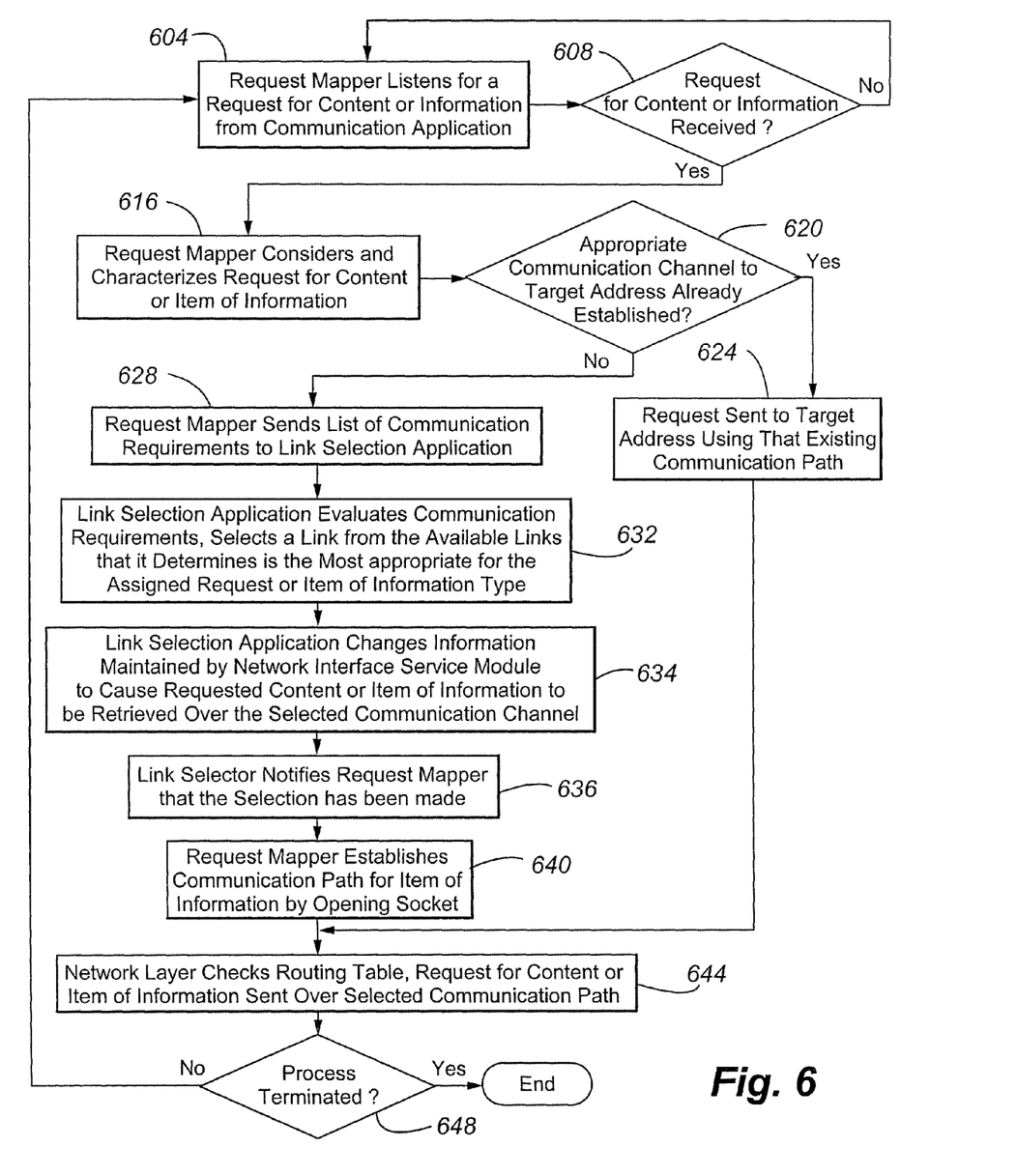
FIG. 6 is a flowchart depicting aspects of the operation of a system in accordance with embodiments of the present invention.

FIG. 6 is a flowchart illustrating aspects of the operation of a communication apparatus 104 in accordance with embodiments of the present invention. Initially, at step 604, the request mapper 408 is in an idle state in which it listens for a request for content or a request for an item of information 512 from the communication application 404. Typically, the initial request in a series will be a request for content, such as a request for an html page. Subsequent requests may then comprise requests for items of information 512 identified in the response made by the server apparatus 108 to the initial request for content. In accordance with embodiments of the present invention, the communication application 404 is configured to direct all requests for content and information to a port provided by the request mapper 408. At step 608, a determination is made as to whether a request for content or an item of information 512 has been received at the request mapper 408. If no request for content or item of information 512 is received, the process returns to step 604, and the request mapper 408 continues to listen for such a request.

If a request for content or an item of information 512 is detected by the request mapper 408 at step 608, the request mapper then examines the item of information. In particular, at step 616, a request for content or an item of information included in the request for content is considered and characterized. The characterization of the request for content or the item of information 512 can include classifying, categorizing and/or prioritizing the request for content or the item of information 512. For example, if an item of information 512 comprises voice data as part of a realtime transfer protocol (RTP) or other realtime communication, the item of information may be characterized as being time sensitive, and categorized or prioritized as such. As another example, if an item of information 512 comprises a body of text and the request for content was determined to be for a body of text, the item of information may be characterized as being central to the requested content, and may be categorized or prioritized appropriately. As a further example, if an item of information 512 is determined to comprise an animated script, and the request for content made by the browser 404 was for a body of text, the item of information 512 can be characterized as being peripheral to the requested content, and appropriately categorized or prioritized. Accordingly, an item of information 512 can be assigned to or indicated as belonging to a particular item of information 512 type.

Embodiments of the present invention may also use metadata to characterize items of information. For example, the html code that is returned to the communication apparatus 104 as part of a request for content can arrange or present links or scripts for included items of information 512 according to category, or can provide an identification or description of type. This characterization of the item of information can then be presented to the link selection application 420 by the request mapper 408. As a further example, links or scripts associated with requesting items of information can include information that identifies the type of information to which the request pertains or the priority or characterization that should be applied. A user can also provide input to direct the request mapper 408 to characterize or treat an item of information 512 in a particular way.

The request mapper 408 then determines whether a communication channel 112 to the target address 110 that is appropriate for the content or the individual item of information has already been established (step 620). In particular, the request mapper 408 determines whether the requested content or item of information is directed to a new target address 110, or is of a new type or class. If it is to a target address 110 and is associated with a type or class for which a socket has already been established the request for content or information is passed by the request mapper 408 to the transport 412 using the already established socket, and from there down through the network interface service module 416 to the communication network interface 342 associated with the communication channel 112 that has already been established for the type or class of information to which the item of information belongs (step 624).

If the request for content or an item of information is of a new type or class, the request mapper sends a list of communication requirements to the link selection application 420 (step 628). The list of requirements can be obtained from metadata or from a table or other store of requirements parameters included in the request mapper application 408 or accessible to the request mapper 408. The link selection application 420 compares the communication requirements with the available communication channels 112, and selects the communication channel 112 that it determines is the most appropriate for the assigned item of information type (step 632). The selection of a communication channel 112 can include a determination of a status of the communication apparatus 104. For example, if the communication apparatus 104 is low on battery power, a communication channel 112 that requires relatively little battery power may be selected for the item of information if that item of information 512 has a relatively high priority. If the item of information 512 has a relatively low priority, a request for that item of information 512 can be deferred.

The link selection application 420 then changes the network configuration file or routing table in the network interface service module 416 to cause the request for content or the item of information to be made over the interface 342 corresponding to the selected communication channel 112, and to therefore also cause the content or item of information 512 to be retrieved over the selected communication channel 112 (step 634). The link selection application 420 then notifies the request mapper application 408 that the selection has been made (step 636).

At step 640, the request mapper application 408 establishes a path to the target address 110 using the selected communication channel 112. In accordance with embodiments of the present invention, the request mapper application 408 establishes the path by opening a new socket between the request mapper application 408 and the target address 110 using the selected communication channel 112. The network interface service module or layer 416 looks at the target address for the socket, and checks the routing table to identify the interface 342 that has been assigned an address range that includes the address of the new socket, and sends the request to the target address using that interface 342. As can be appreciated by one of skill in the art after consideration of the present disclosure, since embodiments of the present invention allow multiple communication channels 112 to the be established to a single target address 110, the address for the new socket used by the routing table to identify the selected communication channel 112 for individual items of information 512 can comprise an address that includes the single target address 110 as a root address. Accordingly, the different ranges of addresses assigned to different interfaces 342 stored in the routing table can comprise addresses that all share the single target address 110 as the root address. After establishing a selected communication channel 112 at step 640, or after determining that an appropriate communication path 112 has already been established at step 624, the request for the item of information is sent over the selected communication path 112 (step 644). Accordingly, the requested information will be returned over that same communication path 112. As a result, embodiments of the present invention allow different items of information 508 associated with or part of a common request for content 504 to be retrieved using different communication channels 112.

At step 648, a determination may be made as to whether the process has been terminated. If the process has not been terminated, the process returns to step 604.

In addition to selecting a communication channel 112 based on the characterization of a requested item of information, embodiments of the present invention are capable of retrieving different items of information associated with a common request for content 504 and available from the same target address 110 simultaneously. For example, while one item of information containing a relatively large amount of data and/or that is assigned to a communication channel 112 associated with a first socket that provides a relatively slow transfer rate is being delivered to the communication apparatus 104, other items of information can be obtained on one or more other communication channels associated with other sockets. That is, a plurality of communication channels 110 connecting a communication apparatus 104 to a target address 110 can be operable simultaneously.

Although exemplary embodiments of the present invention have been discussed in connection with execution of instructions by a processor provided as part of a controller of a communication apparatus 104, it should be appreciated that other configurations can be provided. For example, the controller 304 of the communication apparatus 104 may comprise a first processing platform, while an associated device such as a docking or base station 232 and/or a computer 228 can comprise second and/or third processing platforms. In an arrangement with multiple processing platforms, different applications or modules (or portions of applications or modules) may run on different processing platforms. In accordance with still other embodiments of the present invention, a processing platform may be provided as part of the electronics of a vehicle that are interfaced to a communication apparatus 104, either directly or through a docking station 232.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A communication device, comprising:
   a first processing platform;
   a communication interface, wherein the communication interface is configured to support communications over one or more communication channels;
   a communication application running on the first processing platform, wherein the communication application operates to request selected content that includes a plurality of items of information from a service associated with a target address;
   a request mapper application running on the first processing platform or a second processing platform,
      wherein the request mapper operates to observe the plurality of items of information from the service associated with the target address and to characterize each of the items of information included in the plurality of items of information, wherein each of the items of information are part of a first web page, and
   a link selection application running on the first processing platform, the second processing platform, or a third processing platform,
   wherein the link selection application is informed of the characterization of each of the items of information that are part of the first web page by the request mapper and based on the characterization of at least some of the items of information selects a first one of the communication channels for obtaining at least a first one of the plurality of selected items of information that are part of the first web page and notifies a network interface application to use the selected first one of the communication channels to obtain the first one of the plurality of items of information that are part of the first web page, and wherein the link selection application informs the request mapper to open a socket for the first one of the plurality of items of information that are part of the first web page, wherein at least a first script included in scripts observed by the request mapper includes an indication of priority, wherein the first script is related to the first item of information, and wherein the indication of priority is used by the link selection application in selecting the communication channel used for obtaining the first item of information.

2. The communication device of claim 1, wherein based on the characterization of at least some of the items of information the link selection application selects a second one of the communication channels for obtaining at least a second one of the plurality of selected items of information that are part of the first web page, and wherein at least some of the first information and at least some of the second information is obtained simultaneously.

3. The communication device of claim 2, wherein the first communication channel establishes a first link between the communication device and the target address, and wherein the second communication channel establishes a second link between the communication device and the target address.

4. The communication device of claim 3, wherein the target address comprises an Internet Protocol (IP) address.

5. The communication device of claim 3, wherein the first and second links comprise different sockets established between the communication device and a target device associated with the target address, and wherein the different sockets exist simultaneously.

6. The communication device of claim 2, wherein the first and second items are received by the communication device at about the same time, such that at least a portion of the first item of information is being received by the communication device using the first communication channel at the same time at least a portion of the second item of information is being received by the communication device using the second communication channel.

7. The communication device of claim 2, wherein the first one of the communication channels comprises a wireless connection to a macro-cell base station, and wherein the second one of the communication channels comprises a wireless connection to a short-range base station.

8. The communication device of claim 1, wherein the communication application comprises a browser application.

9. The communication device of claim 1, wherein the communication device includes a multiple-mode wireless telephone.

10. The communication device of claim 1, further comprising a plurality of communication interfaces.

11. A method for selecting a communication channel, comprising:
requesting content from a first target, wherein the requested content includes a plurality of items of information comprising a web page, wherein requesting content includes:
making a first request, wherein the first request is for a first item of information included in the plurality of items of information;
making a second request, wherein the second request is for a second item of information included in the plurality of items of information;
characterizing the first item of information as a first type of information, wherein characterizing the first item of information as a first type of information includes assigning a first priority to the first item of information, wherein assigning a first priority to the first item of information includes identifying a priority identifier associated with a first script accessed in response to requesting content from a first target;
characterizing the second item of information as a second type of information, wherein the first and second types are different;
in response to characterizing the first item of information as a first type of information, selecting a first communication channel for use in obtaining the first item of information;
in response to characterizing the second item of information as a second type of information, selecting the first communication channel or a second communication channel for use in obtaining the second item of information;
in response to assigning the first priority to the first request, initiating the first request;
in response to assigning the second priority to the second request, initiating the second request wherein the first request is initiated prior to the second request.

12. The method of claim 11, further comprising:
identifying a plurality of available communication channels,
wherein the plurality of available communication channels includes the first and second communication channels,
wherein the first request is to the first target and identifies the first item of information,
wherein the first item of information is accessible through the first target,
wherein the first request is initiated over the first communication channel included in the plurality of available communication channels,
wherein the second request is to the first target and identifies the second item of information, and
wherein the second request is initiated over the second communication channel included in the plurality of available communication channels.

13. The method of claim 12, wherein the first request is fulfilled over the first channel, and wherein the second request is fulfilled over the second communication channel.

14. The method of claim 11, wherein characterizing the first item of information as a first type of information includes identifying a type of content associated with the first item of information, and wherein characterizing the second item of information as a second priority type of information includes identifying a type of content associated with the second item of information, the method further comprising:
determining a status of a communication device associated with the first and second requests;
in response to a first status of the communication device being determined, proceeding with the first request and terminating the second request.

15. The method of claim 14, wherein the first status of the communication device comprises a low battery status.

16. The method of claim 11, wherein characterizing the first item of information as a first type of information includes identifying a communication channel identifier associated with the first script accessed in response to requesting content from a first target.

17. The method of claim 11, wherein requesting content further includes:
requesting a page;
after creating a document object model description of the requested page, building a list of references to items of information included in the page, wherein the first request and the second request are obtained from the list of references.

18. The method of claim 17, wherein assigning a priority to the first request and assigning a priority to the second request includes comparing at least one of a content and an explicit priority indicator in information associated with at least two of the references in the list of references.

19. A communication system, comprising:
  a plurality of communication channels, wherein each of the plurality of communication channels is capable of supporting communications with a first target;
  means for enabling communications between at least the first target and a user over the plurality of communication channels, including:
    means for obtaining a collection of content from the first target;
    means for generating a list of items included in the collection of content;
    means for assigning a priority to at least two of the items included in the collection of content, wherein each of the at least two items is associated with a script that includes information related to at least one of an information type, priority or characterization that should be applied to the associated item, and wherein the information included in the script is used in characterizing the associated item;
    means for assigning individual ones of the means for providing a communication channel included in the plurality of means for providing a communication channel for use in obtaining a corresponding ones of the items included in the collection of content,
    wherein a first one of the means for providing a communication channel included in the plurality of means for providing a communication channel is assigned to obtain a first item of the at least two of the items included in the collection of content,
    wherein a second one of the means for providing a communication channel included in the plurality of means for providing a communication channel is assigned to obtain a second item of the at least two of the items included in the collection of content,
    wherein the first item is assigned a higher priority than the second item, and
    wherein the first means for providing a communication channel is determined to be capable of supplying requested items more quickly than the second channel.

20. The communication device of claim 1, wherein each item of information included in the items of information is associated with a script that includes information related to at least one of an information type, priority, or characterization that should be applied to the associated item of information, and wherein the information included in the script is used in characterizing the associated item of information.

21. The communication device of claim 20, wherein the script includes information identifying the priority of the associated item of information, wherein the indication of priority is used by the link selection application in selecting the communication channel used for obtaining the first item of information.

* * * * *